United States Patent
Lin et al.

(10) Patent No.: US 11,710,412 B1
(45) Date of Patent: Jul. 25, 2023

(54) METHOD AND DEVICE FOR FLIGHT PATH PLANNING CONSIDERING BOTH THE FLIGHT TRAJECTORY AND THE VISUAL IMAGES FROM AIR TRAFFIC CONTROL SYSTEMS FOR AIR TRAFFIC CONTROLLERS

(71) Applicant: Sichuan University, Chengdu (CN)

(72) Inventors: Yi Lin, Chengdu (CN); Jianwei Zhang, Chengdu (CN)

(73) Assignee: Sichuan University, Chengdu (CN)

( * ) Notice: Subject to any disclaimer, the term of this patent is extended or adjusted under 35 U.S.C. 154(b) by 0 days.

(21) Appl. No.: 18/154,776

(22) Filed: Jan. 13, 2023

(30) Foreign Application Priority Data

Sep. 23, 2022 (CN) .......................... 202211163730.4

(51) Int. Cl.
  *G08G 5/00* (2006.01)
  *G06N 3/092* (2023.01)
  *G06N 3/0464* (2023.01)

(52) U.S. Cl.
  CPC ........... *G08G 5/003* (2013.01); *G06N 3/0464* (2023.01); *G06N 3/092* (2023.01)

(58) Field of Classification Search
  CPC .... G08G 5/003; G08G 5/0034; G08G 5/0039; G08G 5/0043; G08G 5/0047; G08G 5/0052; G08G 5/0078; G08G 5/0004; G08G 5/0008; G08G 5/0017; G06N 3/0464; G06N 3/092
  See application file for complete search history.

(56) References Cited

U.S. PATENT DOCUMENTS

| | | | | |
|---|---|---|---|---|
| 8,467,919 B2 * | 6/2013 | Klooster | ................ | G01C 21/20 701/5 |
| 9,443,434 B2 * | 9/2016 | Hale | ...................... | G08G 5/003 |
| 10,675,932 B2 * | 6/2020 | Nam | ......................... | B60F 5/02 |
| 10,860,115 B1 * | 12/2020 | Tran | ....................... | G06F 3/0346 |
| 2005/0049762 A1 * | 3/2005 | Dwyer | ................. | G08G 5/0021 701/3 |

(Continued)

FOREIGN PATENT DOCUMENTS

| CN | 101572019 A | 11/2009 |
|---|---|---|
| CN | 106019987 A | 10/2016 |

(Continued)

*Primary Examiner* — Mussa A Shaawat
(74) *Attorney, Agent, or Firm* — Nitin Kaushik (57) ABSTRACT

The invention discloses a method to support the trajectory planning considering both the flight trajectory and the visual images (VI) from air traffic control (ATC) system for air traffic controllers (ATCOs) (VI from ATC system for ATCOs), comprising the following steps: Step 1: acquire the VI and the flight trajectory to serve as the method inputs, and extract features of the VI and the relative position of the aircraft; Step 2: construct reinforcement learning-based methods to support the decision-making for flight path planning and conduct the training procedures of the models in the proposed method; Step 3: based on the optimized reinforcement learning-based methods, predict the required operation sequence to guide the flight to the target waypoint. The method of the invention can support the flight path planning for air traffic operation in a safe and efficient manner and is able to reduce the workload of air traffic controllers.

7 Claims, 5 Drawing Sheets

(56) References Cited

U.S. PATENT DOCUMENTS

| | | | |
|---|---|---|---|
| 2006/0146048 A1* | 7/2006 | Wright | G01C 23/00 345/419 |
| 2007/0129855 A1* | 6/2007 | Coulmeau | G08G 5/0056 701/3 |
| 2007/0208465 A1* | 9/2007 | Gremmert | G05D 1/0607 701/4 |
| 2007/0288156 A1* | 12/2007 | Neff | F41G 7/343 701/533 |
| 2008/0140273 A1* | 6/2008 | Deker | G05D 1/101 701/14 |
| 2010/0052949 A1* | 3/2010 | Suddreth | G01C 23/00 340/995.19 |
| 2010/0191458 A1* | 7/2010 | Baker | G06Q 10/04 705/40 |
| 2010/0191754 A1* | 7/2010 | Baker | G06Q 10/109 707/E17.107 |
| 2011/0087428 A1* | 4/2011 | Barnetche | G01C 23/00 701/532 |
| 2013/0027226 A1* | 1/2013 | Cabos | G08G 5/0082 340/961 |
| 2013/0080043 A1* | 3/2013 | Ballin | G05D 1/0005 701/120 |
| 2013/0085672 A1* | 4/2013 | Stewart | G08G 5/003 701/528 |
| 2017/0076611 A1* | 3/2017 | Shamasundar | G08G 5/0013 |
| 2018/0129212 A1* | 5/2018 | Lee | H04N 23/69 |
| 2018/0141656 A1* | 5/2018 | Heinonen | B64C 39/024 |
| 2019/0035286 A1* | 1/2019 | Cao | G08G 5/045 |
| 2019/0080619 A1* | 3/2019 | Priest | G05D 1/0005 |
| 2019/0139420 A1* | 5/2019 | Ward | G06F 3/04883 |
| 2021/0383708 A1* | 12/2021 | Gibbons, II | G08G 5/0021 |
| 2022/0122466 A1* | 4/2022 | Feyereisen | G08G 5/0021 |
| 2022/0189316 A1* | 6/2022 | Paul | G08G 5/0021 |
| 2022/0215760 A1* | 7/2022 | Jorgensen | G08G 5/0065 |
| 2022/0335837 A1* | 10/2022 | Agyekum | G08G 5/0091 |
| 2022/0343769 A1* | 10/2022 | Motahar | G06T 17/00 |
| 2023/0077909 A1* | 3/2023 | Arnicar | G06N 20/00 701/23 |
| 2023/0112803 A1* | 4/2023 | Herriot | G08G 5/0021 701/415 |

FOREIGN PATENT DOCUMENTS

| | | |
|---|---|---|
| CN | 112258898 A | 1/2021 |
| CN | 113140134 A | 7/2021 |

* cited by examiner

METHOD AND DEVICE FOR FLIGHT PATH PLANNING CONSIDERING BOTH THE FLIGHT TRAJECTORY AND THE VISUAL IMAGES FROM AIR TRAFFIC CONTROL SYSTEMS FOR AIR TRAFFIC CONTROLLERS

CROSS-REFERENCE TO RELATED APPLICATIONS

The application claims priority to Chinese patent application No. 202211163730.4, filed on Sep. 23, 2022, the entire contents of which are incorporated herein by reference.

TECHNICAL FIELD

The present invention pertains to the field of intelligent air traffic control technology, in particular to a method and device for flight path planning considering both the flight trajectory and the visual images (VI) from air traffic control (ATC) system for air traffic controllers (ATCOs).

BACKGROUND

The ATCOs play an important role in ensuring flight safety and efficiency in ATC. The ATCOs are required to take over the arriving flights from the previous airspace, and guide the aircraft to the target waypoint to subsequent airspace based on surveillance devices while maintaining a safe interval. Currently, the flight safety entirely relies on the ATC decision since the aircrew fails to accurately capture the flight environment. With the increasing air traffic flow, the real-time decisions made by the ATCOs cannot meet the requirements of safety and efficiency of air traffic operation, and further limit the airspace capacity.

As a general machine learning paradigm, deep reinforcement learning has been proved to be a feasible solution for decision-making with desired flexibility in complex traffic situations. The existing reinforcement learning-based decision-making methods mostly consider collected flight trajectory or ADS-B data and select the positions of nearest flights (fix number) as input data. This kind of methods can only consider the aircraft interval maintenance in the local airspace, which fails to global traffic situations in the whole airspace to make an efficient path planning. The issued operations by ATCO are required to maintain the safe interval among aircraft pairs, in addition, the decisions should guide the flights to their target waypoints in an orderly and efficient manner. In practice, the human ATCO makes the operations not only by the flight trajectories, but also the visual images from air traffic control system for air traffic controllers.

SUMMARY

Aiming at the problems existing in prior arts, the present invention provides a method and device for flight path planning considering both the flight trajectory and the visual images (VI) from ATC system for air traffic controllers to assist the decision-making of air traffic controllers.

The technical solution used in the present invention is as follows:

A method for flight path planning considering both the flight trajectory and the visual images from ATC system for air traffic controllers, comprising the following steps:

Step 1: Acquire the VI and the flight trajectory, preprocess the VI, and extract features of the VI and the relative position of the aircraft;

Step 2: Construct reinforcement learning-based methods to support the decision-making for flight path planning, and conduct the training procedures of the models in the proposed method;

The reinforcement learning-based methods to support the decision-making for flight path planning include a route planning module (RPM), an action selection module (ASM) and a fusion module (FM);

The RPM is used to predict the route sequence to the target waypoint according to the features of the VI and the relative position of the aircraft acquired in Step 1;

The FM is used to generate fused features considering both the flight trajectory and the VI according to the route sequence and flight trajectory to the target waypoint;

The ASM is used to obtain the next operation for flight path planning according to the fused features outputted by the FM;

Step 3: Feed the features of the VI and the flight trajectory into the reinforcement learning-based methods to support the decision-making for flight path planning trained in Step 2 to obtain the flight path planning operation to make the flight path control decision.

Furthermore, the pre-processing in Step 1 includes the following processing processes:

Step 1-1: Acquire the VI, and resize the image to the predefined size;

Step 1-2: Downsample the image, and output the downsampled image in the form of 3D array;

Step 1-3: Search the RGB value of the flight in the image in the 3D array obtained in Step 1-2, and obtain the relative position of the aircraft according to the RGB value.

Furthermore, the RPM in Step 2 includes a convolutional neural network and fully connected layers;

The convolutional neural network takes the VI as inputs, learns VI features, and compresses the data dimension;

The fully connected layers take the relative position of the flight as inputs and learn the relative position features; the VI features and relative position features are concatenated and fed into the fully connected layers for further features extraction.

Furthermore, the Actor-Critic-based reinforcement learning framework is adopted to train the RPM, and the training process is as follows:

Construct a value estimation network Critic (Critic) and an action output network Actor (Actor); the Critic evaluates the action outputted from the Actor, while the Actor outputs the route sequence selection;

Assign a reward to the traffic situation corresponding to the current flight trajectory by a dedicatedly designed reward function;

Train the Critic and Actor to achieve the network convergence.

Furthermore, the FM comprises fully connected layers and an attention mechanism;

The fully connected layers are used to extract features from the route sequence and the flight trajectory with the same shape;

The attention mechanism is used to aggregate information by assigning learnable weights to route sequence and flight trajectory to generate fused features H; the mathematical notations are as follows:

$$\begin{cases} Q = XW_Q + b_Q \\ K = XW_K + b_K \\ V = XW_V + b_V \\ H = \text{softmax}\left(\dfrac{QK^T}{\sqrt{d}}\right)V \end{cases}$$

Where, Q, K and V are the three weight matrices in the attention mechanism, X is the matrix composed of processed route sequence and flight trajectory, $W_Q$, $W_K$ and $W_V$ are linear transformation matrices, $b_Q$, $b_K$ and $b_V$ are bias vectors, d is the vector dimension, and T is the transpose of matrix.

Furthermore, the ASM in Step 2 includes fully connected layers, the route sequence and flight trajectory outputted by the RPM are inputted into the fully connected layers, and the features of flight trajectory and VI are extracted and fused; the Actor-Critic-based reinforcement learning framework is adopted for training the ASM, and the training process is as follows:

Construct a value estimation network Critic (Critic) and an action output network Actor (Actor); the Critic evaluates the action outputted from the Actor, the Actor outputs the decision-making for the ATCO action; the ATCO's decision-making actions are selected from maintaining current state, left turn, right turn, ascent, descent, acceleration, and deceleration;

Assign a reward to the traffic situation corresponding to the current flight trajectory by a dedicatedly designed reward function;

Train the Critic and Actor to achieve the network convergence.

Furthermore, the reward function in the RPM is as follows:

$$\text{reward} = \begin{cases} \alpha \sum_{t=0}^{r} r_t & \text{Aircrafts arrive at the target waypoint} \\ 0 & \text{Aircrafts conflict midway} \end{cases}$$

Where, $r_t$ is the reward of Step t in the ASM, t is the number of steps for the flight action, T is the maximum number of flight action steps, and a is a constant.

Furthermore, the reward function in the ASM is as follows:

$$reward = \begin{cases} \frac{deg(\theta_{el\_waypoint}, \theta_{waypoint}) * \alpha}{\max(dist, 1) * \beta} * (1 - deg(\theta_{aircraft}, \theta_{waypoint})) + & \text{Aircraft flying normally} \\ abs(h - gp\_altitude) \\ 1000 + \max((limit\_steps - total\_steps) * \gamma, 0) & \text{Aircraft arriving at the target waypoint} \\ -200 & \text{Aircraft flying unusually (flying out of the airspace or below minimum vectoring altitude)} \end{cases}$$

Where, $\theta_{rel\_waypoint}$ is the relative angle between the aircraft and the target waypoint, $\theta_{waypoint}$ is the heading of the target waypoint, $\theta_{aircraft}$ is the aircraft heading, h is the flight altitude, gp_altitude is the altitude where the aircraft starts taxiing, dist is the distance between the aircraft and target waypoint, limit_steps is the limit of steps in one episode of reinforcement learning, total_steps is the number of steps currently performed, deg is a function to calculate the relative angle, α, β and γ are weight coefficients, and abs is a function to return the absolute value.

Furthermore, the training process of Critic and Actor is as follows:

Let the Critic parameter be $\phi_{targ}$, the Actor parameter be $\theta_{targ}$, and the optimization target of Critic is:

$$\phi' = \underset{\phi}{\operatorname{argmin}} \sum_{t=0}^{T} (V_\phi(s_t) - \hat{R}_t)^2$$

The optimization target of Actor is:

$$\theta' = \underset{\theta}{\operatorname{argmax}} \sum_{t=0}^{T} ((r_t + V_\phi(s_{t+1}) - V_\phi(s_t)) * \pi_\theta(a_t|s_t))$$

Where, $\phi'$ is the updated parameters for Critic network, $V_\phi$ is the Critic network, $s_t$ is the expression of the processed and fused VI, flight trajectory and selected route sequence in the traffic situation at time t, $\hat{R}_t$ is the sum of rewards obtained from 0 to t, $\theta'$ is the updated parameters for Actor network, $r_t$ is the reward obtained at t, $s_{t+1}$ is the expression of the VI, flight trajectory and selected route sequence in the traffic situation at t+1, $\pi_\theta$ is the Actor network, and $a_t$ is the route sequence selection action in RPM or ATC decision-making action in ASM at t;

The loss functions of the two networks are calculated in turn, and the network parameters are updated by gradient descent method.

A device for flight path planning considering both the flight trajectory and the visual images from ATC system for air traffic controllers, comprising:

A visual input module for acquiring the VI and the flight trajectory;

An information processing module for pre-processing and considering both the VI and the flight trajectory;

A decision-making module for making flight path control decisions based on the processed information.

The present invention has the following beneficial effects:

(1) The present invention takes both the flight trajectory and VI as inputs to obtain the necessary situational information of the entire airspace and make a decision considering flight environments of all flights in the airspace, enabling the aircraft to reach the target waypoint efficiently while ensuring safe aircraft interval and making full use of airport runway resources;

(2) The present invention constructs reinforcement learning-based methods to achieve the decision-making, including a route planning module and an action selection module; the two modules are separately trained to enhance their robustness and stability, effectively improve the efficiency of decision-making while ensuring the overall performance, which can practically support the flight path planning;

(3) The present invention processes visual images by downsampling and pixelation to reduce the input dimension and the computation complexity without degrading the method performance;

(4) The reward function constructed by the present invention takes into account the effects of aircraft angle, altitude and position and flight time, which ensures an efficient convergence of the reinforcement learning-based methods;

(5) The decision-making and planning by considering the VI in the present invention are based on the expert knowledge of human ATCO, and are able to generate more practical operations realizing human-like decision-makings for air traffic operations.

DETAILED DESCRIPTION OF THE EMBODIMENTS

The present invention is further described with reference to the drawings and embodiments.

Figure 1:
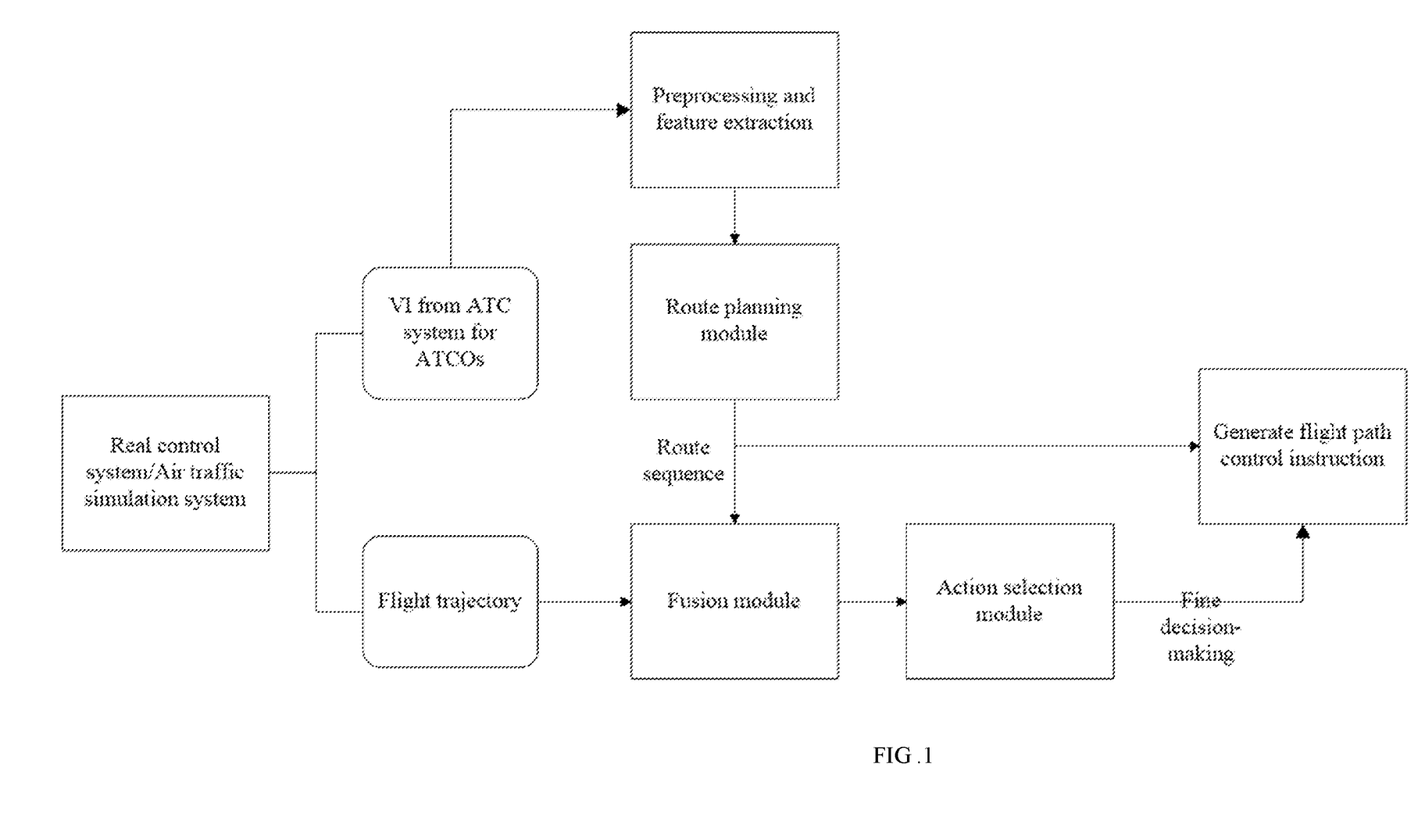
FIG. 1 is a flow diagram of the method in the present invention.
Figure 2:
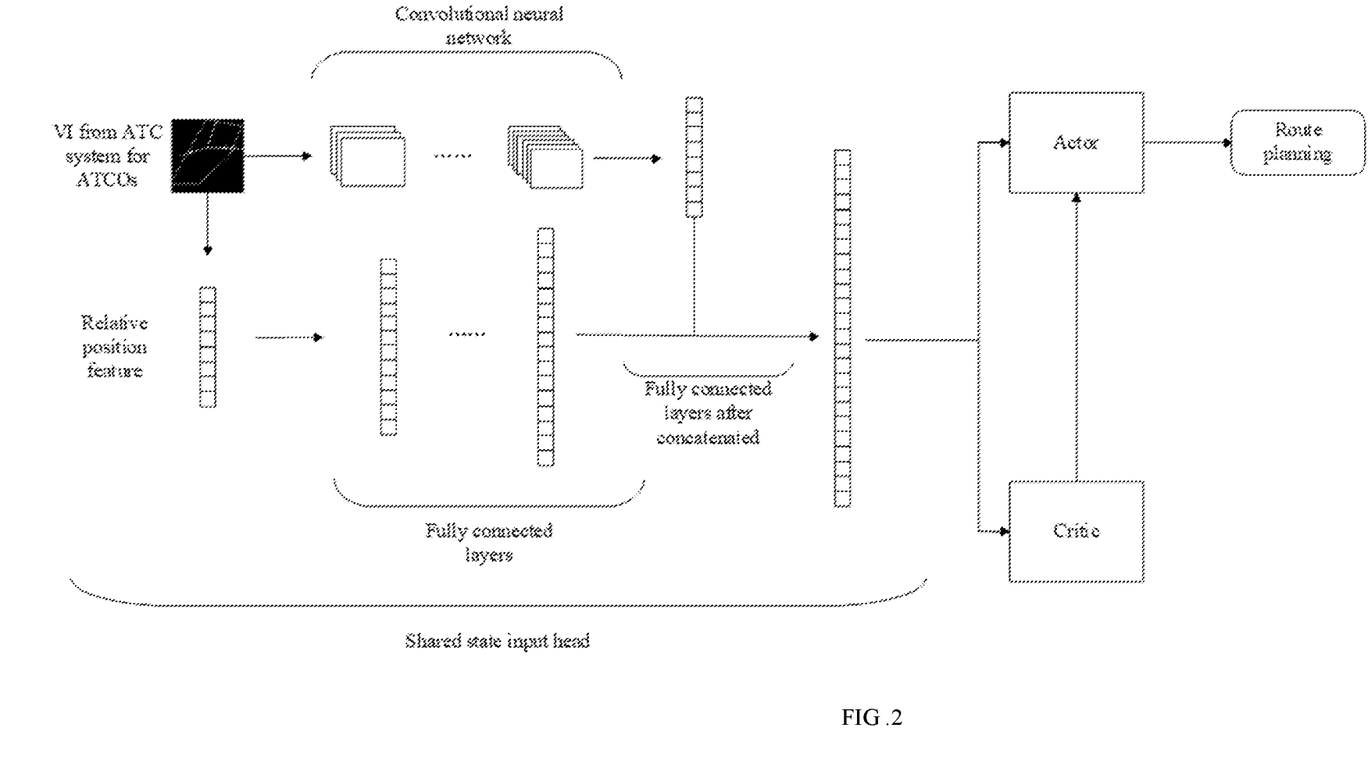
FIG. 2 is a structural diagram of the RPM in the present invention.
Figure 4:
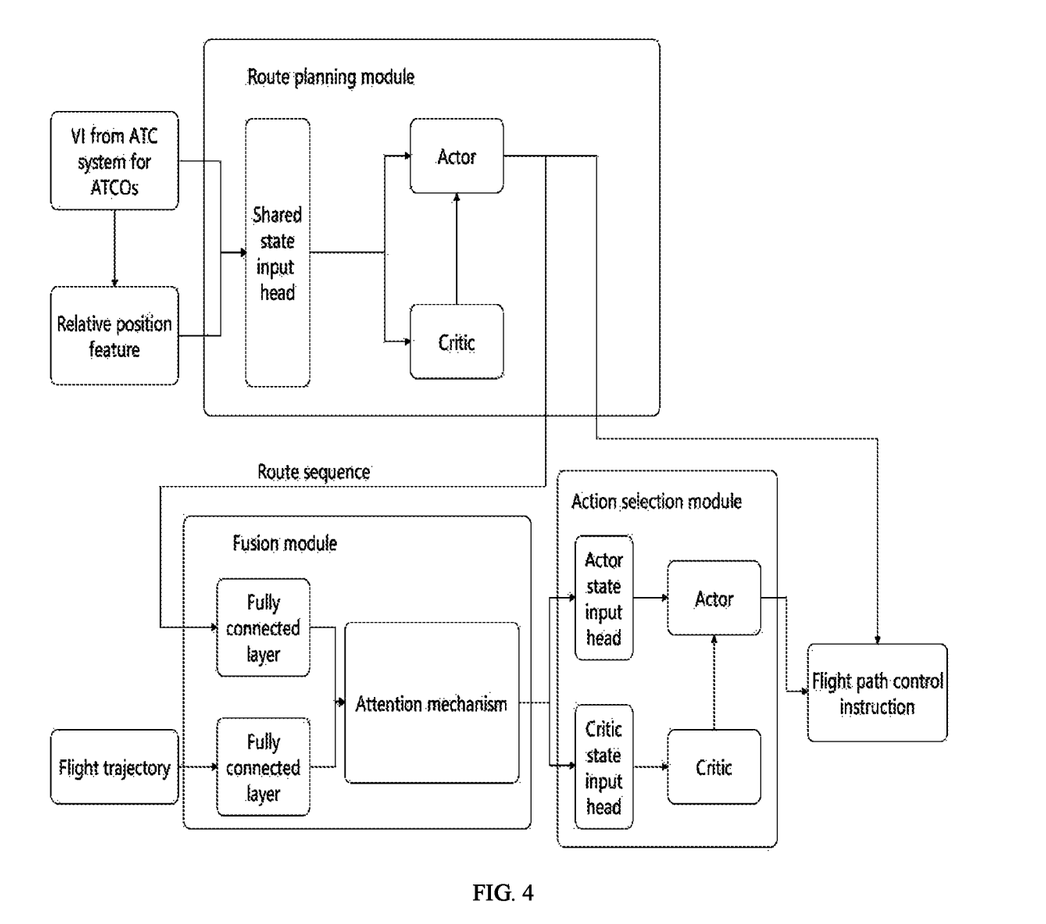
FIG. 4 is a schematic diagram of reinforcement learning-based methods to support the decision-making for flight path planning in the present invention.

As shown in FIG. 1, a method for flight path planning considering both the flight trajectory and the visual images from ATC system for air traffic controllers includes the following steps:

Step 1: Acquire the VI and the flight trajectory, preprocess the VI, and extract features of the VI and the relative position of the aircraft;

The pre-processing process is as follows:

Step 1-1: Run the air traffic simulation BlueSky and store the image rendered by radarwidget module in BlueSky into the buffer; extract the image from the buffer and resize the image according to the input format of the reinforcement learning-based methods to support the decision-making for flight path planning;

Step 1-2: Downsample the image to give a pixelated effect and read out the downsampled image in the form of 3D array;

Step 1-3: Search the RGB value of the flight in the image in the array obtained in Step 1-2, obtain the relative position of the aircraft in the image, and distinguish the aircraft receiving the operation from other aircrafts in the control area according to the different RGB values;

Step 2: Construct reinforcement learning-based methods to support the decision-making for flight path planning, and conduct the training separately on the RPM and ASM;

As shown in FIG. 4, the reinforcement learning-based methods to support the decision-making for flight path planning include a route planning module, an action selection module and a fusion module;

The RPM is used to predict the route sequence to the target waypoint according to the features of the VI and the relative position of the aircraft acquired in Step 1;

As shown in FIG. 2, the RPM includes a convolutional neural network and fully connected layers;

The convolutional neural network takes the VI as inputs, learns VI features, and compresses the data dimension;

The fully connected layers take the relative position of the flight as inputs and learn the relative position features; the VI features and relative position features are concatenated and fed into the fully connected layers for further features extraction.

The Actor-Critic-based reinforcement learning framework is adopted to train the RPM until the method can stably obtain the reward exceeding the benchmark, and then it is cascated with the RPM to work out the reinforcement learning-based methods to support the decision-making for flight path planning.

The training process is as follows:

Construct a value estimation network Critic (Critic) and an action output network Actor (Actor); the Critic evaluates the action outputted from the Actor, while the Actor outputs the route sequence selection;

Assign a reward to the traffic situation corresponding to the current flight trajectory by a dedicatedly designed reward function;

Train the Critic and Actor to achieve the network convergence. The Critic and Actor share a state input head, which is the network structure of this module.

The reward function is as follows:

$$reward = \begin{cases} \alpha \sum_{t=0}^{r} r_t & \text{Aircrafts arrive at the target waypoint} \\ 0 & \text{Aircrafts conflict midway} \end{cases}$$

Where, $r_t$ is the reward of Step t in the ASM, t is the number of steps for the flight action, T is the maximum number of flight action steps, and $\alpha$ is a constant.

The FM is used to generate fused features considering both the flight trajectory and the VI according to the route sequence and flight trajectory to the target waypoint;

The FM includes fully connected layers and an attention mechanism;

The fully connected layers are used to extract features from the route sequence and the flight trajectory with the same shape;

The attention mechanism is used to aggregate information by assigning learnable weights to route sequence and flight trajectory to generate fused features H; the mathematical notations are as follows:

$$\begin{cases} Q = XW_Q + b_Q \\ K = XW_K + b_K \\ V = XW_V + b_V \\ H = \text{softmax}\left(\frac{QK^T}{\sqrt{d}}\right)V \end{cases}$$

Where, Q, K and V are the three weight matrices in the attention mechanism, X is the matrix composed of processed route sequence and flight trajectory, $W_Q$, $W_K$ and $W_V$ are linear transformation matrices, $b_Q$, $b_K$ and $b_V$ are bias vectors, d is the vector dimension, and T is the transpose of matrix.

Figure 3:
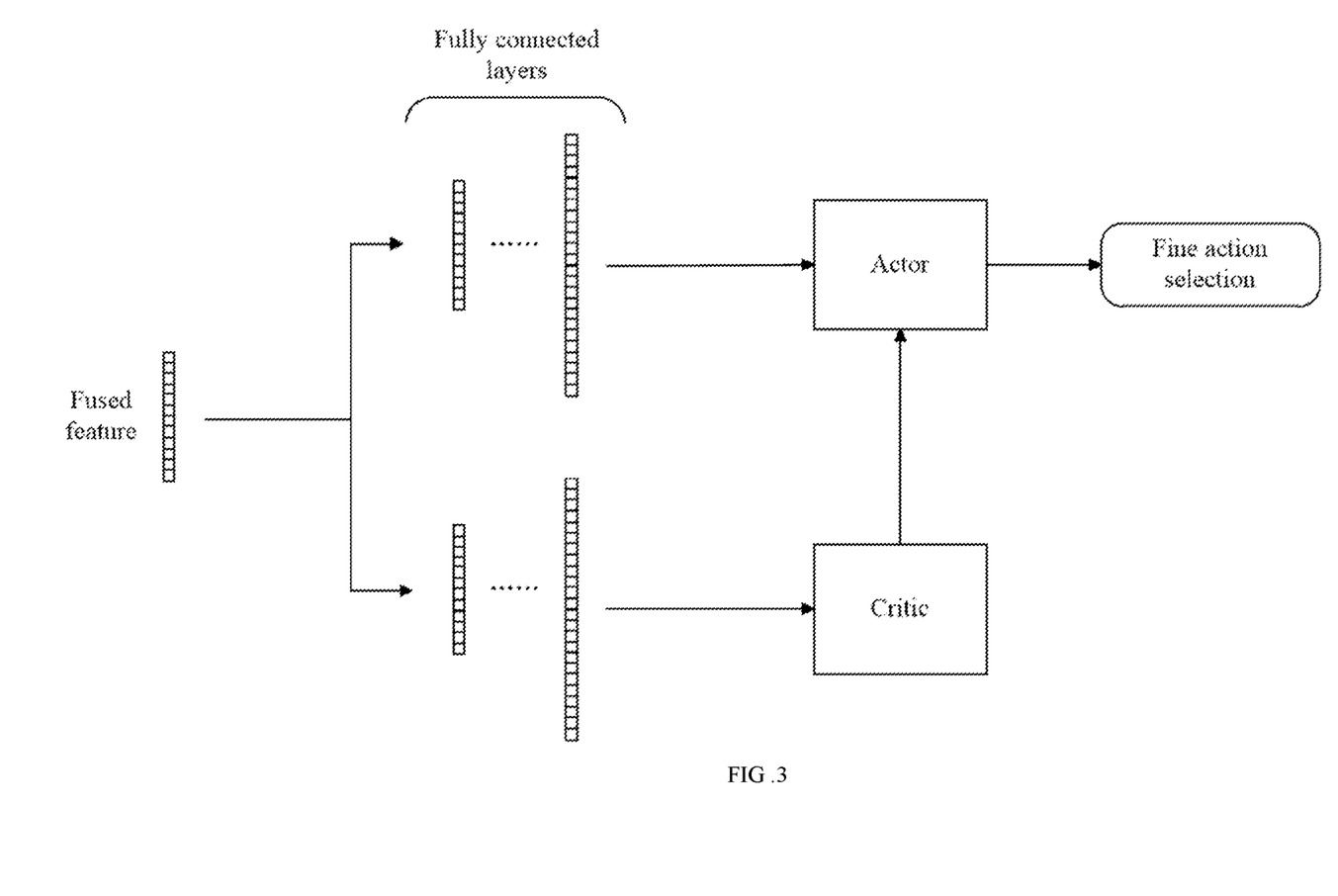
FIG. 3 is a structural diagram of the ASM in the present invention.

As shown in FIG. 3, the ASM considers both the flight trajectory and VI, which is used to obtain the next operation for flight path planning according to the route sequence and flight trajectory to the target waypoint;

The ASM includes fully connected layers; the route sequence and flight trajectory outputted from the RPM are concatenated together and fed into the fully connected layers; the features considering both the flight trajectory and VI are extracted; the training process is as follows:

Construct a value estimation network Critic (Critic) and an action output network Actor (Actor); the Critic evaluates the action outputted from the Actor, receives the decision-making action outputted by the Actor, and outputs a scalar as the value of the decision-making action in the current situation; the Actor outputs the decision-making for the ATCO action;

Assign a reward to the traffic situation corresponding to the current flight trajectory by a dedicatedly designed reward function;

Train the Critic and Actor to achieve the network convergence.

The reward function is as follows:

reward =

$$\begin{cases} \dfrac{deg(\theta_{rel\_waypoint}, \theta_{waypoint}) * \alpha}{\max(dist, 1) * \beta} * \\ (1 - deg(\theta_{aircraft}, \theta_{waypoint})) + & \text{Aircraft flying normally} \\ abs(h - gp\_altitude) \\ 1000 + \max((\text{limit\_steps} - & \text{Aircraft arriving at} \\ \text{total\_steps}) * \gamma, 0) & \text{the target waypoint} \\ & \text{Aircraft flying unusually} \\ -200 & \text{(flying out of the airspace or} \\ & \text{below minimum vectoring altitude)} \end{cases}$$

Where, $\theta_{rel\_waypoint}$ is the relative angle between the aircraft and the target waypoint, $\theta_{waypoint}$ is the heading of the target waypoint, $\theta_{aircraft}$ is the aircraft heading, h is the flight altitude, gp_altitude is the altitude where the aircraft starts taxiing, dist is the distance between the aircraft and target waypoint, limit_steps is the limit of steps in one episode of reinforcement learning, total_steps is the number of steps currently performed, deg is a function to calculate the relative angle, $\alpha$, $\beta$ and $\gamma$ are weight coefficients, and abs is a function to return the absolute value.

The decision-making actions outputted by the Actor are discrete ATCO's decision-making actions, including maintaining current state, left turn, right turn, ascent, descent, acceleration and deceleration.

The training process of Critic and Actor is as follows:

Let the Critic parameter be $\phi_{targ}$, the Actor parameter be $\theta_{targ}$, and the optimization target of Critic is:

$$\phi' = \arg\min_\phi \sum_{t=0}^{T} (V_\phi(s_t) - \hat{R}_t)^2$$

The optimization target of Actor is:

$$\theta' = \arg\max_\theta \sum_{t=0}^{T} ((r_t + V_\phi(s_{t+1}) - V_\phi(s_t)) * \pi_\theta(a_t|s_t))$$

Where, $\phi'$ is the updated parameters for Critic network. $V_\phi$ is the Critic network, $s_t$ is the expression of the processed and fused VI, flight trajectory and selected route sequence in the traffic situation at time t, $\hat{R}_t$ is the sum of rewards obtained from 0 to t, $\theta'$ is the updated parameters for Actor network, $r_t$ is the reward obtained at t, $s_{t+1}$ is the expression of the VI, flight trajectory and selected route sequence in the traffic situation at t+1, $\pi_\theta$ is the Actor network, and $a_t$ is the route sequence selection action in RPM or ATC decision-making action in ASM at t;

The loss functions of the two networks are calculated in turn, and the network parameters are updated by gradient descent method.

Figure 5:
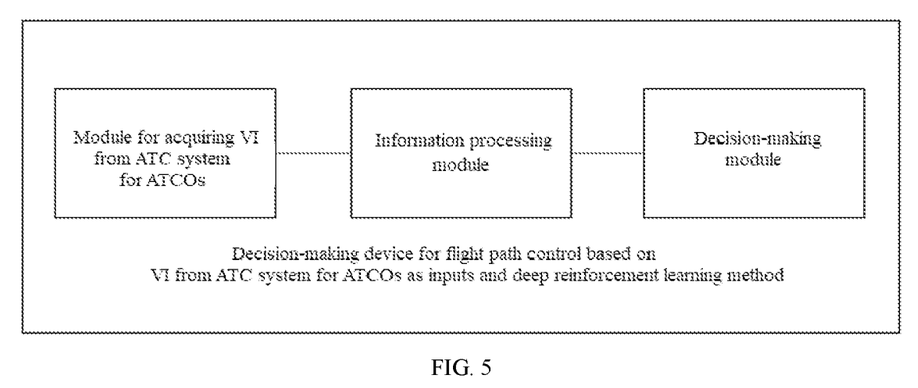
FIG. 5 is a structural diagram of the decision-making device in the present invention.

As shown in FIG. 5, a decision-making device for flight path planning considering both the flight trajectory and the VI, comprising:

A visual input module for acquiring the VI and the flight trajectory;

An information processing module for pre-processing and considering both the VI and the flight trajectory;

A decision-making module for making flight path control decisions based on the processed information.

In the present invention, the decision-making method realizes the feature extraction of the information by collecting the VI and flight trajectory and using the reinforcement learning-based methods constructed by deep neural networks. The stable flight path planning operation is extracted to control the flights, so as to achieve the end-to-end flights path planning. At the input side of the system, the VI for ATCOs can be obtained, making the system more robust and capable to handle more complex air traffic situation and make stable decisions that are more similar to human ATCOs. The method can support the flight path planning for air traffic operation in a safe and efficient manner and is able to reduce the workload of air traffic controllers.

What is claimed is:

1. A method for flight path planning considering both the flight trajectory and the visual images (VI) from air traffic control (ATC) system for air traffic controllers (ATCOs), comprising the following steps:

Step 1: Acquire the VI and the flight trajectory, preprocess the VI and extract features of the VI and the relative position of the aircraft;

Step 2: Construct reinforcement learning-based methods to support the decision-making for flight, path planning, and conduct the training procedures of the models in the proposed method;

The reinforcement learning-based methods to support the decision-making for flight path planning comprise a route planning module (RPM), an action selection module (ASM) and a fusion module (FM);

The RPM is used to predict the route sequence to the target waypoint according to the features of the VI and the relative position of the aircraft acquired in Step 1;

The FM is used to generate fused features considering both the flight trajectory and the VI according to the route sequence and the flight trajectory to the target waypoint;

The FM comprises fully connected layers and an attention mechanism;

The fully connected layers are used to extract features from the route sequence and the flight trajectory with the same shape;

The attention mechanism is used to aggregate information by assigning learnable weights to route sequence and flight trajectory to generate fused features H; the mathematical notations are as follows:

$$\begin{cases} Q = XW_Q + b_Q \\ K = XW_K + b_K \\ V = XW_V + b_V \\ H = \text{softmax}\left(\dfrac{QK^T}{\sqrt{d}}\right)V \end{cases}$$

Where, Q, K and V are the three weight matrices in the attention mechanism, X is the matrix composed of processed route sequence and flight trajectory, $W_Q$, $W_K$ and $W_V$ are linear transformation matrices, $b_Q$, $b_K$ and $b_V$ are bias vectors, d is the vector dimension, and T is the transpose of matrix;

The ASM is used to obtain the next operation for flight path planning according to the fused features outputted by the FM;

The ASM comprises fully connected layers, and the fused features obtained from the FM serve as inputs; the Actor-Critic-based reinforcement learning framework is adopted for training the ASM, and the training process is as follows:

Construct a value estimation network Critic (Critic) and an action output network Actor (Actor); the Critic evaluates the action outputted from the Actor; the Actor outputs the decision-making for the ATCO action: the ATCO's decision-making actions are selected from maintaining current state, left turn, right turn, ascent, descent, acceleration, and deceleration;

Assign a reward to the traffic situation corresponding to the current flight trajectory by a dedicatedly designed reward function;

Train the Critic and Actor to achieve the network convergence;

The reward function in the ASM is as follows;

$$\text{reward} = \begin{cases} \dfrac{deg(\theta_{rel\_waypoint}, \theta_{waypoint}) * \alpha}{\max(dist, 1) * \beta} * \\ \quad (1 - deg(\theta_{aircraft}, \theta_{waypoint})) + & \text{Aircraft flying normally} \\ \quad \text{abs}(h - \text{gp\_altitude}) \\ 1000 + \max((\text{limit\_steps} - & \text{Aircraft arriving at} \\ \quad \text{total\_steps}) * \gamma, 0) & \text{the target waypoint} \\ & \text{Aircraft flying unusually} \\ -200 & \text{(flying out of the airspace or} \\ & \text{below minimum vectoring altitude)} \end{cases}$$

Where, $\theta_{rel\_waypoint}$ is the relative angle between the aircraft and the target waypoint, $\theta_{waypoint}$ is the heading of the target waypoint, $\theta_{aircraft}$ is the aircraft heading, h is the flight altitude, gp_altitude is the altitude where the aircraft starts taxiing, dist is the distance between the aircraft and target waypoint, limit_steps is the limit of steps in one episode of reinforcement learning, total_steps is the number of steps currently performed, deg is a function to calculate the relative angle, $\alpha$, $\beta$ and $\gamma$ are weight coefficients, and abs is the function to return the absolute value;

Step 3: Feed the features of the VI and the flight trajectory into the reinforcement learning-based methods to support the decision-making for flight path planning trained in Step 2 to obtain the flight path planning operation to make the flight path control decision.

2. The method for flight path planning considering both the flight trajectory and the visual images from ATC system for air traffic controllers according to claim 1, wherein the pre-processing in Step 1 comprises the following processing processes;

Step 1-1: Acquire the VI, and resize the image to the predefined size;

Step 1-2: Downsampled the image, and output the downsampled image in the form of 3D array;

Step 1-3: Search the RUB value of the flight in the image in the 3D array obtained in Step 1-2, and obtain the relative position of the aircraft according to the RGB value.

3. The method for flight path planning considering both the flight trajectory and the visual images from ATC system for air traffic controllers according to claim 1, wherein the RPM in Step 2 comprises a convolutional neural network and fully connected layers;

The convolution neural network takes the VI as inputs, learns VI features, and compresses the data dimension;

The fully connected layers take the relative position of the flight as inputs and learn the relative position features; the VI features and relative position features are concatenated and fed into the fully connected layers for further features extraction.

4. The method for flight path planning considering both the flight trajectory and the visual images from ATC system for air traffic controllers according to claim 3, wherein the Actor-Critic based reinforcement learning framework is adopted to train the RPM, and the training process is as follows:

Construct a value estimation network Critic (Critic) and an action output network Actor (Actor); the Critic evaluates the action outputted from the Actor, while the Actor outputs the route sequence selection;

Assign a reward to the traffic situation corresponding to the current flight trajectory by a dedicatedly designed reward function Train the Critic and Actor to achieve the network convergence.

5. The method for flight path planning considering both the flight trajectory and the visual images from ATC system for air traffic controllers according to claim 4, wherein the reward function iii the RPM is as follows:

$$reward = \begin{cases} \alpha \sum_{t=0}^{r} r_t & \text{Aircrafts arrive at the target waypoint} \\ 0 & \text{Aircrafts conflict midway} \end{cases}$$

Where, $r_t$ is the reward of Step t in the ASM, t is the number of steps for the flight action, T is the maximum number of flight action steps, and $\alpha$ is a constant.

6. The method for flight path planning considering both the flight trajectory and the visual images from ATC system for air traffic controllers according to claim 1, wherein the training process of Critic and Actor is as follows:

Let the Critic parameter be $\phi_{targ}$, the Actor parameter be $\theta_{targ}$, and the optimization target of Critic is:

$$\phi' = \underset{\phi}{\mathrm{argmin}} \sum_{t=0}^{T} (V_\phi(s_t) - \hat{R}_t)^2$$

The optimization target of Actor is:

$$\theta' = \underset{\theta}{\mathrm{argmax}} \sum_{t=0}^{T} ((r_t + V_\phi(s_{t+1}) - V_\phi(s_t)) * \pi_\theta(a_t|s_t))$$

Where, $\phi'$ is the updated parameters for Critic network, $V_\phi$ is the Critic network, $s_t$ is the expression of the processed and fused VI, flight trajectory and selected route sequence in the traffic situation at time t, $\hat{R}_t$ is the sum of rewards obtained from 0 to t, $\theta'$ is the updated parameters for Actor network, $r_t$ is the reward obtained at t, $s_{t+1}$ is the expression of the VI, flight trajectory and selected route sequence in the traffic situation at t+1, $\pi_\theta$ is the Actor network, and $a_t$ is the route sequence selection action in RPM or ATC decision-making action in ASM at t;

The loss functions of the two networks are calculated in turn, and the network parameters are updated by gradient descent method.

7. A device for adopting the method for flight path planning considering both the flight trajectory and the visual images from ATC system for air traffic controllers according to claim 1, comprising:

A visual input module for acquiring the VI and the flight trajectory;

An information processing module, for pre-processing and considering both the VI and the flight trajectory;

A decision-making module for making flight path control decisions based on the processed information.

* * * * *